(12) United States Patent
Senda et al.

(10) Patent No.: US 6,737,906 B2
(45) Date of Patent: May 18, 2004

(54) SEMICONDUCTOR INTEGRATED CIRCUIT DEVICE INCLUDING A NEGATIVE POWER SUPPLY CIRCUIT

(75) Inventors: Minoru Senda, Hyogo (JP); Masaki Tsukude, Hyogo (JP)

(73) Assignee: Renesas Technology Corp., Tokoyo (JP)

(*) Notice: Subject to any disclaimer, the term of this patent is extended or adjusted under 35 U.S.C. 154(b) by 88 days.

(21) Appl. No.: 09/986,871

(22) Filed: Nov. 13, 2001

(65) Prior Publication Data
US 2002/0175744 A1 Nov. 28, 2002

(30) Foreign Application Priority Data
May 24, 2001 (JP) ........................................ 2001-154992

(51) Int. Cl.[7] .................................................. G05F 1/10
(52) U.S. Cl. ........................ 327/535; 327/538; 327/540
(58) Field of Search .................................. 327/536, 535, 327/534, 538, 540, 590; 307/110; 363/59, 60

(56) References Cited

U.S. PATENT DOCUMENTS

| | | | |
|---|---|---|---|
| 5,168,174 A | * | 12/1992 | Naso et al. ................. 327/536 |
| 5,231,315 A | * | 7/1993 | Thelen, Jr. .................. 327/513 |
| 5,532,618 A | * | 7/1996 | Hardee et al. ................. 326/63 |
| 5,694,072 A | * | 12/1997 | Hsiao et al. ................. 327/537 |
| 5,905,682 A | * | 5/1999 | Gans et al. .................. 365/201 |
| 6,333,864 B1 | * | 12/2001 | Nishimura et al. ........... 363/78 |

FOREIGN PATENT DOCUMENTS

JP    2000-48600    2/2000

* cited by examiner

Primary Examiner—Timothy P. Callahan
Assistant Examiner—An T. Luu
(74) Attorney, Agent, or Firm—McDermott, Will & Emery

(57) ABSTRACT

In operation, a charge pumping circuit supplies negative charges to an internal voltage line so as to reduce a negative internal voltage. A voltage dividing circuit produces a control voltage according to the difference between a first positive voltage externally applied to a first input terminal in the test mode and the internal voltage. A comparison circuit operates the charge pumping circuit according to the comparison result between a second positive voltage externally applied to a second input terminal in the test mode and the control voltage. The second positive voltage is set according to a target value of the negative internal voltage.

6 Claims, 4 Drawing Sheets

US 6,737,906 B2

SEMICONDUCTOR INTEGRATED CIRCUIT DEVICE INCLUDING A NEGATIVE POWER SUPPLY CIRCUIT

BACKGROUND OF THE INVENTION

1. Field of the Invention

The present invention generally relates to a semiconductor integrated circuit device. More particularly, the present invention relates to a semiconductor integrated circuit device including a negative power supply circuit for generating a negative internal voltage.

2. Description of the Background Art

FIG. 4 is a schematic block diagram showing the structure of a conventional semiconductor integrated circuit device 50 incorporating a negative internal power supply therein.

Referring to FIG. 4, the conventional semiconductor integrated circuit 50 includes an input terminal PN, a signal line SL, an internal voltage supply line PL for supplying a negative internal voltage Vnn to an internal circuit group, a charge pumping circuit CP for generating a negative voltage on the internal voltage supply line PL, a protection diode DG, and transistor switches T1, T2, T3.

An external electric signal is applied to the input terminal PN. The signal line SL is electrically coupled to the input terminal PN. The charge pumping circuit CP operates when a pump enable signal PE is active. In operation, the charge pumping circuit CP supplies negative charges to the internal voltage supply line PL. The protection diode DG serves to remove a negative surge voltage produced at the input terminal PN.

FIG. 5 is a conceptual diagram illustrating functionality of the protection diode DG.

Referring to FIG. 5, the protection diode DG is connected between the ground voltage Vss and the signal line SL, wherein the forward direction thereof is the direction from the ground voltage Vss toward the signal line SL.

An electric signal to be applied to the input signal PN in the normal operation is set to at least the ground voltage Vss. Therefore, the protection diode DG will not be forward-biased, and the applied electric signal is transmitted to the signal line SL.

When a negative surge voltage is produced at the input terminal PN, the protection diode DG is forward-biased, forming between the signal line SL and the ground voltage Vss a path for removing the negative surge voltage. However, such a protection circuit structure would cause a stationary leak current Ileak to flow into the input terminal PN when a negative voltage VTn needs to be applied to the input terminal PN.

FIG. 6 is a circuit diagram showing the structure of a protection circuit that allows a negative voltage to be applied to the input terminal.

The protection circuit of FIG. 6 additionally includes a transistor switch T1 connected between the anode of the protection diode DG and the ground voltage Vss, and a transistor switch T2 connected between the anode of the protection diode DG and the internal voltage supply line PL.

The transistor switches T2 and T1 are turned ON/OFF in a complementary manner in response to a test mode signal TM and an inverted signal thereof, respectively. The test mode signal TM is activated to H level in the test mode, and inactivated to L level in the normal operation.

In the normal operation, the transistor switches T1 and T2 are turned ON and OFF, respectively, whereby the same protection circuit as that of FIG. 5 is formed for the input terminal PN.

In the test mode, the transistor switches T1 and T2 are turned OFF and ON, respectively, as opposed to the normal operation. As a result, the anode of the protection diode is electrically coupled to the internal voltage supply line PL for supplying a negative voltage. Therefore, even when a negative voltage VTn is applied to the input terminal PN in the test mode, no stationary leak current is produced at the input terminal PN in the range of VTn>Vnn+Von (where Von is an ON voltage of the protection diode DG).

Accordingly, the protection circuit of FIG. 6 is conventionally provided in a circuit that requires a negative voltage VTn to be applied to its input terminal. On the other hand, the protection circuit of FIG. 5 having a simplified structure is conventionally provided in a circuit that does not require a negative voltage VTn to be applied to its input terminal.

Referring back to FIG. 4, the transistor switch T3 is turned ON in the test mode so as to electrically couple the input terminal PN and the internal voltage supply line PL to each other through the signal line SL.

In the normal operation, the transistor switch T3 electrically disconnects the input terminal PN and the internal voltage supply line PL from each other. In the normal operation, the charge pumping circuit CP operating in response to activation of the pump enable signal PE supplies negative charges, producing an internal voltage Vnn.

In general, a not-shown control circuit controls the negative voltage produced by the charge pumping circuit by comparing the negative voltage with a prescribed target value and activating or inactivating the pump enable signal according to the comparison result.

In the test mode, various operation tests such as accelerated test must be conducted with various levels of the internal voltage Vnn. Therefore, in the conventional semiconductor integrated circuit device internally generating a negative voltage, the internal voltage Vnn is externally applied in the test mode in order to facilitate adjustment of the voltage level.

The conventional semiconductor integrated circuit device 50 includes the protection circuit of FIG. 6 for the input terminal PN. Therefore, generation of the leak current is prevented even when a negative voltage to be transmitted to the internal voltage supply line PL is applied to the input terminal PN in the test mode.

In response to the need for improved functionality and integration of the semiconductor integrated circuit devices, a plurality of circuits formed on different chips are sealed in the same mold. In such a semiconductor integrated circuit device, the same input terminal may be shared by the plurality of chips.

FIG. 7 is a conceptual diagram illustrating the problems caused by application of negative voltage to the input terminal shared by a plurality of chips.

Referring to FIG. 7, chips CHa and CHb are sealed in the same mold and share the input terminal PN.

The chip CHa is a circuit that does not require a negative internal voltage, and therefore does not require application of external negative voltage during operation including the test mode. Accordingly, a protection diode DGa having the same structure as that of FIG. 5 is provided for a signal line SLa connected to the input terminal PN.

On the other hand, the chip CHb is a circuit that requires a negative internal voltage, and therefore requires application of external negative voltage in the test mode. Accordingly, a protection diode DGb and transistors T1 and T2 are provided so as to form the same protection circuit as that of FIG. 6.

Thus, when a negative voltage is applied to the input terminal PN, the protection diode DGa in the chip CHa is forward-biased, producing a stationary leak current Ileak. This causes latch-up or the like, thereby possibly destabilizing the overall operation of the circuitry.

In other words, the structure of the protection circuit required in the chip CHa varies depending on whether or not the input terminal is shared with another chip CHb that requires application of negative voltage, thereby degrading versatility of the design. Providing the same protection circuit as that of FIG. 6 in every chip would ensure the versatility of the design. However, this requires unnecessary circuit elements, causing increase in size and manufacturing costs of the circuitry.

SUMMARY OF THE INVENTION

It is an object of the present invention to provide a semiconductor integrated circuit device capable of adjusting the level of a negative internal voltage produced by an internal power supply circuit, without requiring application of external negative voltage.

A semiconductor integrated circuit device according to the present invention includes: an internal voltage supply line for supplying a negative internal voltage to an internal circuit; a control voltage generation circuit for generating a control voltage according to a difference between a first positive voltage and the internal voltage; and a negative power supply circuit for reducing the voltage on the internal voltage supply line in operation. In a test mode, the negative power supply circuit operates according to a comparison result between a second positive voltage and the control voltage. The second positive voltage corresponds to a target value of the internal voltage.

Preferably, the semiconductor integrated circuit device further includes: first and second input terminals capable of externally receiving first and second electric signals, respectively; and first and second input switching circuits respectively corresponding to the first and second input terminals. The first input switching circuit transmits the first electric signal to the internal circuit in normal operation, and transmits the first electric signal to the control voltage generation circuit in the test mode. The second input switching circuit transmits the second electric signal to the internal circuit in the normal operation, and transmits the second electric signal to the negative power supply circuit in the test mode. In the test mode, the first and second positive voltages are respectively applied through the first and second input terminals.

Preferably, the negative power supply circuit includes a charge pumping circuit for supplying negative charges to the internal voltage supply line when an enable signal is active, and a voltage comparison circuit for amplifying a difference between the second positive voltage and the control voltage to produce the enable signal in the test mode.

Alternatively, the control voltage generation circuit preferably includes a voltage dividing circuit for receiving the first positive voltage and the internal voltage and outputting the control voltage based on the voltage difference multiplied by a prescribed voltage dividing ratio.

More preferably, the voltage dividing circuit includes n resistance units (where n is a natural number) electrically coupled between a first node to which the first positive voltage is transmitted and a second node on which the control voltage is generated, and m resistance units (where m is a natural number) electrically coupled between the internal voltage supply line and the second node. The resistance units are fabricated based on same layout design.

Alternatively, the second positive voltage is more preferably set according to the target voltage, the first positive voltage and the voltage dividing ratio.

Such a semiconductor integrated circuit device operates the negative power supply circuit according to the relation between the second positive voltage and the negative internal voltage, enabling adjustment of the internal voltage level without requiring application of negative voltage.

Moreover, the semiconductor integrated circuit device includes the first and second input switching circuits, enabling external adjustment of the internal voltage level in the test mode by using the same input terminals as those used in the normal operation.

Moreover, the negative power supply circuit can be formed with a charge pumping circuit and an operational amplifier circuit each having a commonly used structure.

Moreover, the voltage dividing circuit is formed from the resistance circuits fabricated based on the same layout design. Therefore, variation in voltage dividing ratio of the voltage dividing circuit due to manufacturing variation in resistance value can be suppressed, enabling accurate adjustment of the internal voltage level while eliminating the effects of the manufacturing process variation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
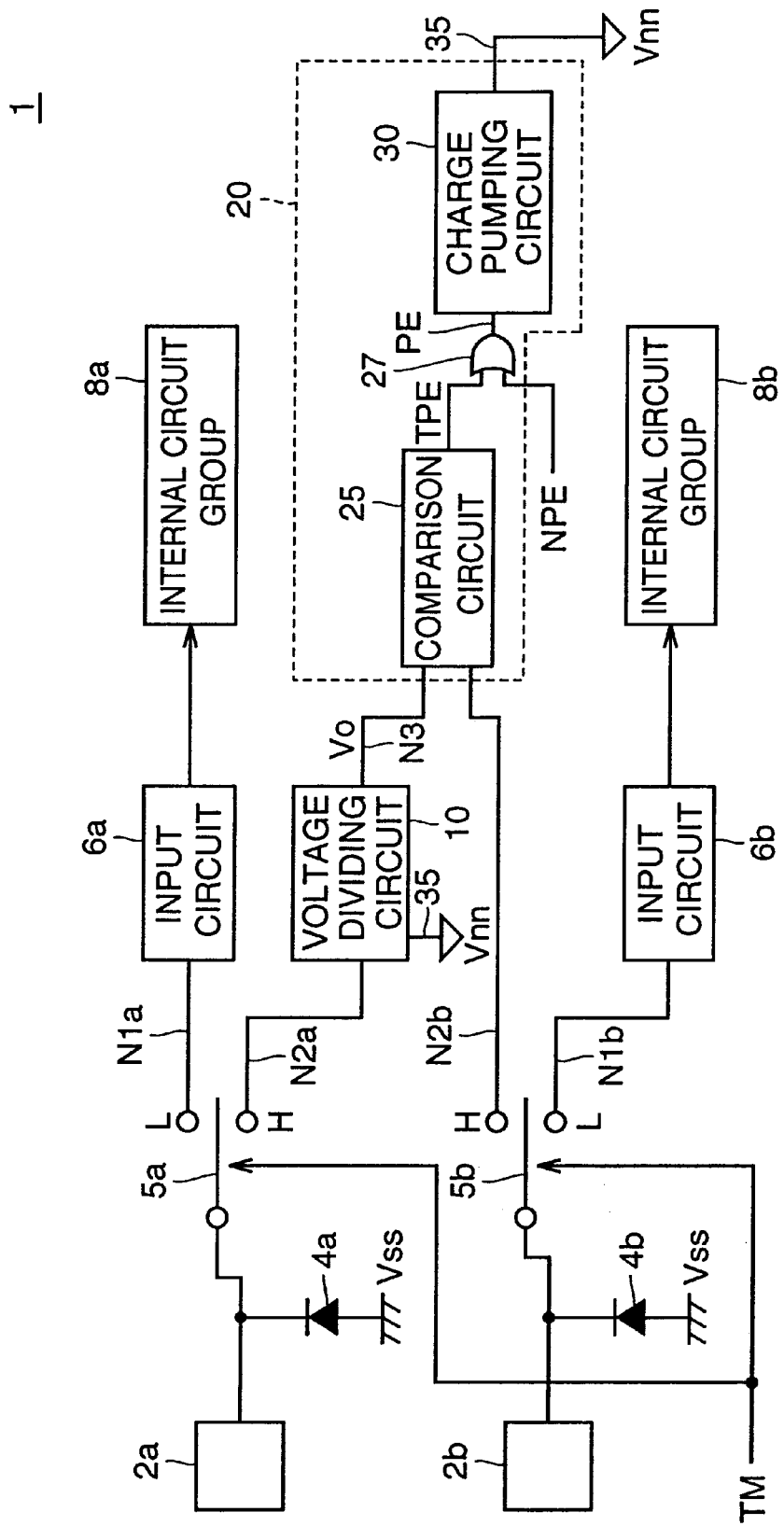
FIG. 1 is a block diagram showing the structure of a semiconductor integrated circuit device according to an embodiment of the present invention.

Hereinafter, embodiments of the present invention are described in detail with reference to the accompanying drawings. Note that, in the following description, the same or corresponding portions are denoted with the same reference numerals and characters.

Referring to FIG. 1, a semiconductor integrated circuit device 1 according to an embodiment of the present invention includes input terminals 2a, 2b, protection diodes 4a, 4b, input switching circuits 5a, 5b, input circuits 6a, 6b, internal circuit groups 8a, 8b, a voltage dividing circuit 10, a negative power supply circuit 20 for producing a negative internal voltage Vnn (<0), and an internal voltage supply line 35 for supplying an internal voltage Vnn.

It is possible to externally apply independent electric signals to the input terminals 2a, 2b, respectively. In the normal operation, electric signals such as data signal, address signal and command control signal are applied to the input terminals 2a, 2b. In the test mode, positive voltages Va (>0) and Vb (>0) for adjusting the level of the internal voltage Vnn are applied to the input terminals 2a, 2b, respectively.

Figure 5:
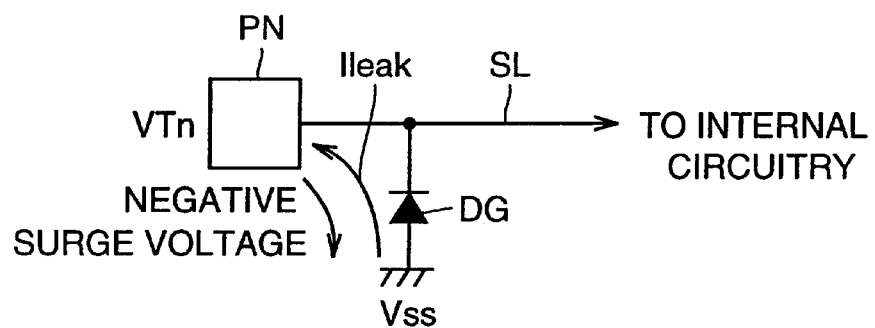
FIG. 5 is a conceptual diagram illustrating functionality of a protection diode of FIG. 4.
Figure 6:
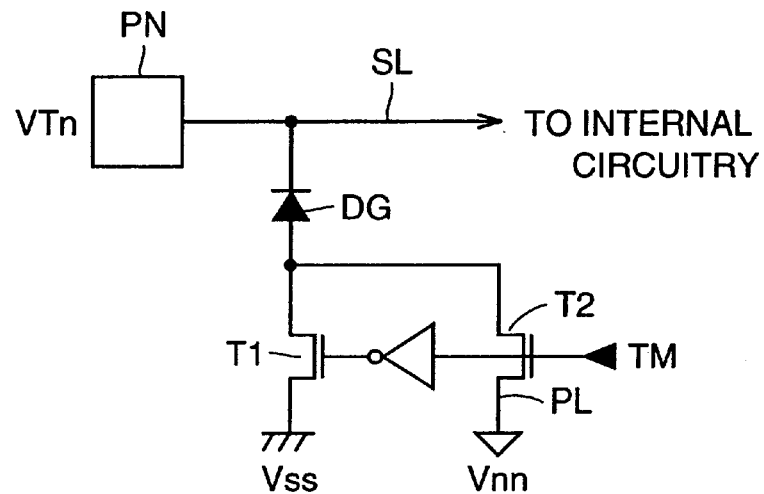
FIG. 6 is a circuit diagram showing the structure of a protection circuit that allows a negative voltage to be applied to an input terminal.
Figure 7:
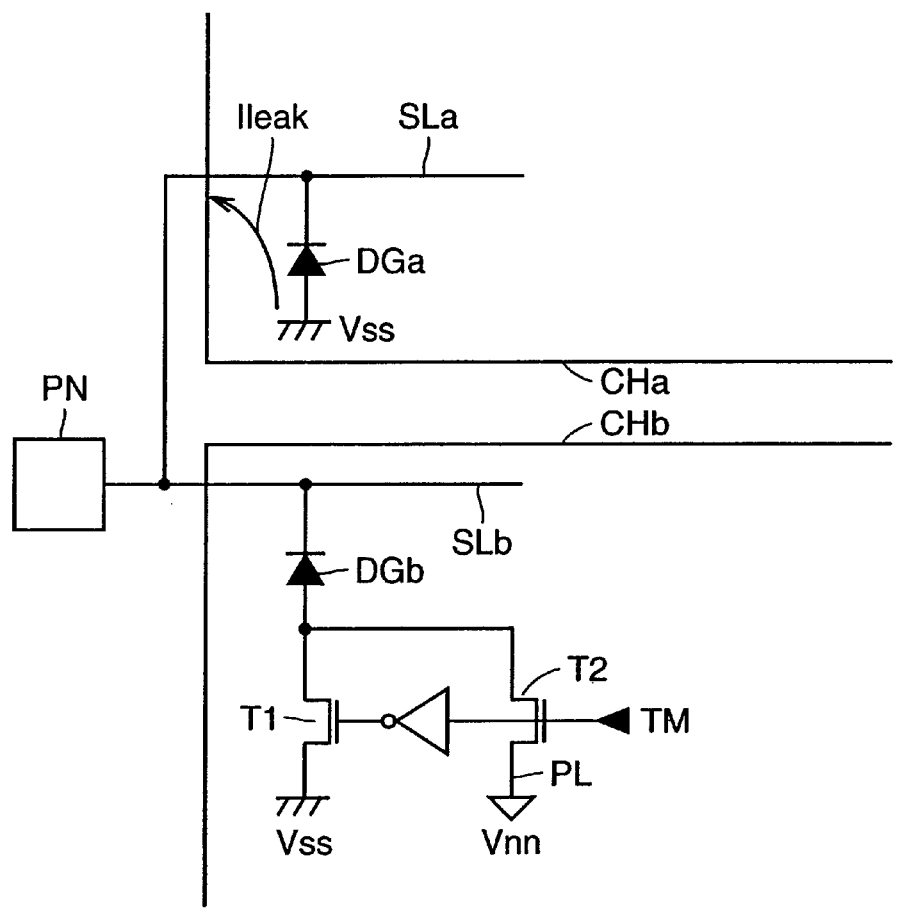
FIG. 7 is a conceptual diagram illustrating the problems caused by application of negative voltage to an input terminal shared by a plurality of chips.

The protection diode 4a is connected between the ground voltage Vss and the input terminal 2a, wherein the forward direction thereof is the direction from the ground voltage Vss toward the input terminal 2a. The protection diode 4a forms a path for removing a negative surge voltage produced at the input terminal 2a. Similarly, the protection diode 4b is connected between the ground voltage Vss and the input terminal 2b, wherein the forward direction thereof is the direction from the ground voltage Vss toward the input terminal 2b. The protection diode 4b serves to remove a negative surge voltage produced at the input terminal 2b. In other words, in the semiconductor integrated circuit device 1, a protection circuit having a simplified structure, i.e., the same protection circuit as that of FIG. 5, is provided for each input terminal 2a, 2b.

The input switching circuit 5a couples the input terminal 2a to either a node N1a or N2a in response to a test mode signal TM. The test mode signal TM is activated to H level in the test mode and inactivated to L level in the normal operation. Thus, the input switch circuit 5a connects the input terminal 2a to the node N1a in the normal operation, and connects the input terminal 2a to the node N2a in the test mode.

Similarly, the input switch circuit 5b connects the input terminal 2b to a node N1b in the normal operation, and connects the input terminal 2b to a node N2b in the test mode.

As a result, the input switch circuits 5a and 5b transmit the electric signals applied to the input terminals 2a and 2b in the normal operation to the internal circuit groups 8a and 8b through the input circuits 6a and 6b, respectively. In the normal operation, the internal circuit groups 8a and 8b conduct a prescribed operation according to the respective transmitted electric signals.

Note that, although the input circuits 6a and 6b as well as the internal circuit groups 8a and 8b are respectively independent of each other in FIG. 1, the electric signals applied to the input terminals 2a and 2b may be transmitted to a common input circuit and a common internal circuit group.

On the other hand, in the test mode, the positive voltages Va and Vb applied to the input terminals 2a and 2b are transmitted to the voltage dividing circuit 10 and a comparison circuit 25 located within the negative power supply circuit 20, respectively.

Figure 2:
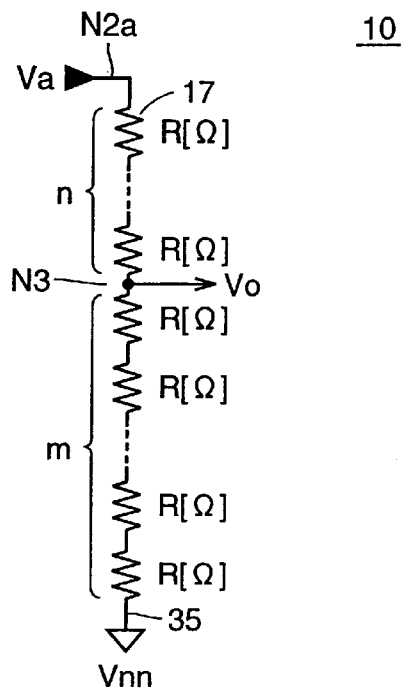
FIG. 2 is a circuit diagram showing the structure of a voltage dividing circuit of FIG. 1.

Referring to FIG. 2, the voltage dividing circuit 10 includes a plurality of resistance units 17 fabricated based on the same layout design. Each resistance unit 17 has a resistance value R [Ω].

In the voltage dividing circuit 10, n resistance units 17 (where n is a natural number) are connected in series between a node N3 on which a control voltage Vo is produced and the node N2a (Va). Similarly, m resistance units 17 (where m is a natural number) are connected in series between the node N3 and the internal voltage supply line 35 (Vnn).

As a result, the control voltage Vo is given by the following equation (1):

$$Vo = Va - K \times (Va - Vnn) \qquad (1)$$

where K is a voltage dividing ratio, and K=n/(m+n).

Accordingly, the voltage dividing circuit 10 functions as a control voltage generation circuit for generating the control voltage Vo according to the difference between the positive voltage Va applied to the input terminal 2a in the test mode and the internal voltage Vnn supplied to the internal voltage supply line 35.

Note that only the series-connected resistance units are used in FIG. 2, the voltage-dividing circuit 10 is not limited to such a structure. In other words, the voltage-dividing circuit may be formed from an arbitrary combination of resistance units 17 fabricated based on the same layout design. Thus, the voltage dividing ratio K in the equation (1) can be stably set while eliminating the effects of the manufacturing process variation.

Referring back to FIG. 1, the negative power supply circuit 20 includes the comparison circuit 25, a logic gate 27 and a charge pumping circuit 30.

The comparison circuit 25 compares the voltages on the nodes N3 and N2b to produce a test pump enable signal TPE. A commonly used operational amplifier circuit can be applied to the comparison circuit 25.

The positive voltage Vb applied to the input terminal 2b and transmitted to the node N2b in the test mode is set according to the following equation (2) based on a target value Vtr of the internal voltage Vnn. The target value Vtr can be arbitrarily set according to the types of operation tests conducted in the test mode or the like.

$$Vb = Va - K \times (Va - Vtr) \qquad (2)$$

As a result, the difference between the control voltage Vo and the positive voltage Vb, which is applied to the comparison circuit 25, is given by the following equation (3):

$$Vo - Vb = K \times (Vnn - Vtr) \qquad (3).$$

Thus, comparison of the magnitude between the positive voltage Vb that is set according to the target value Vtr and the control voltage Vo enables comparison between the internal voltage Vnn and the target value Vtr.

The comparison circuit 25 activates the test pump enable signal TPE to H level when the control voltage Vo is higher than the positive voltage Vb, that is, when the internal voltage must further be reduced.

The logic gate 27 produces a pump enable signal PE based on the OR operation result of the test pump enable signal TPE and a normal pump enable signal NPE.

The charge pumping circuit 30 operates in response to activation of the pump enable signal PE. In operation, the charge pumping circuit 30 supplies negative charges to the internal voltage supply line 35 so as to reduce the internal voltage Vnn. Since a commonly used structure can be applied to the charge pumping circuit 30, detailed description thereof is omitted herein.

In the normal operation, a control circuit (not shown) for monitoring the internal voltage Vnn activates the normal pump enable signal NPE to H level when the internal voltage Vnn is higher than a prescribed value.

Thus, in the normal operation, the charge pumping circuit 30 operates when the internal voltage Vnn is higher than the prescribed value. In the test mode, the charge pumping circuit 30 operates when the internal voltage Vnn is higher than the target value Vtr according to the externally applied first and second positive voltages.

Figure 3:
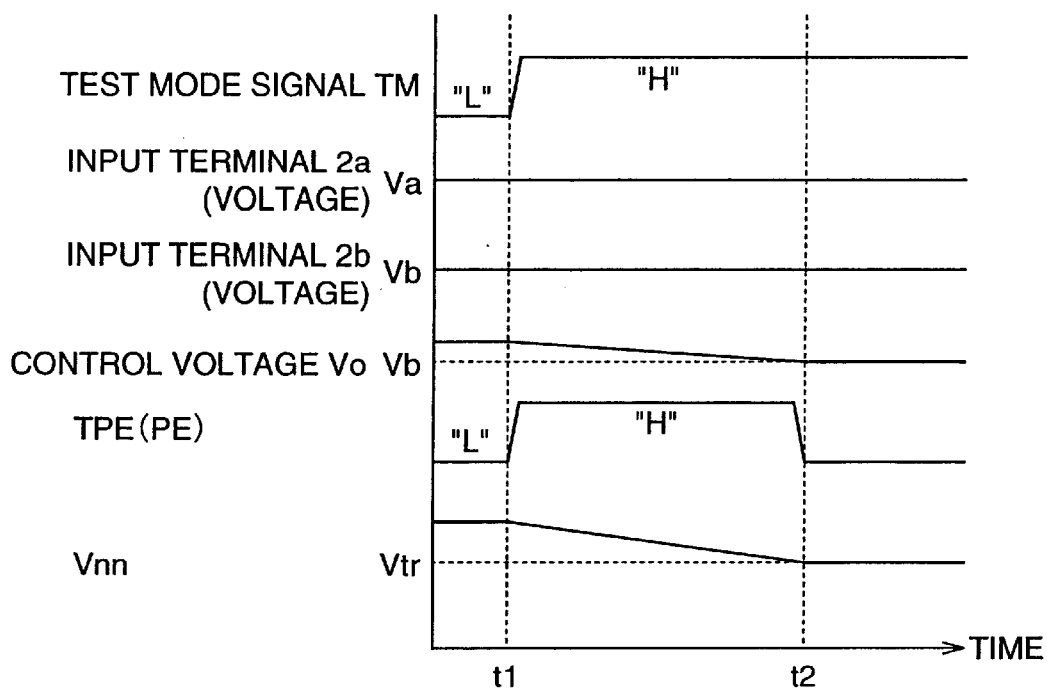
FIG. 3 is a timing chart illustrating the operation of a negative power supply circuit of FIG. 1 in the test mode.
Figure 4:
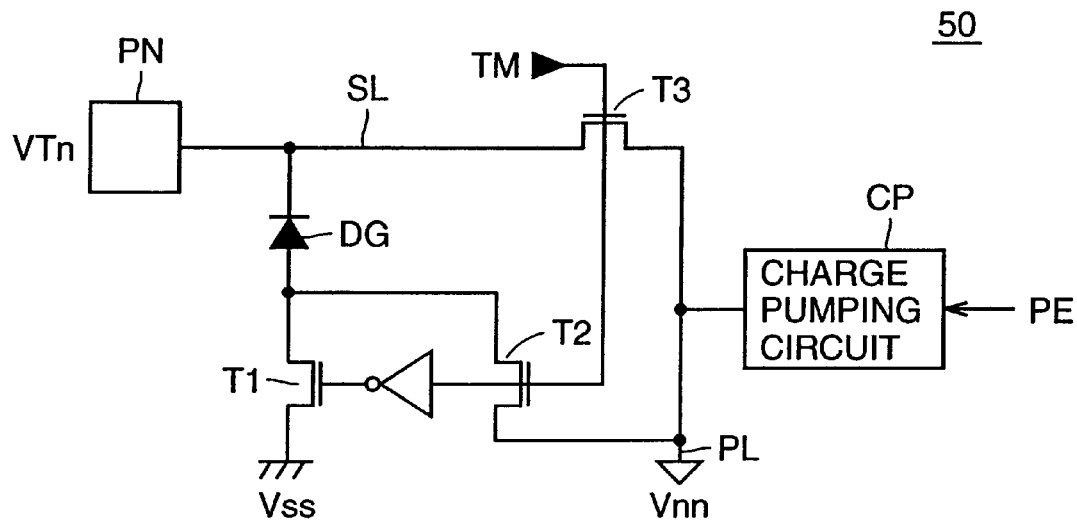
FIG. 4 is a schematic block diagram showing the structure of a conventional semiconductor integrated circuit device incorporating a negative internal power supply therein.

Referring to FIG. 3, at time t1, the test mode signal TM is activated from L level to H level, so that the positive voltages Va and Vb applied to the input terminals 2a and 2b are responsively transmitted to the voltage dividing circuit 10 and the comparison circuit 25, respectively.

At the start of the test mode, the internal voltage Vnn is higher than the target value Vtr, and therefore the control voltage Vo is higher than the positive voltage Vb. Accordingly, the comparison circuit 25 sets the test pump enable signal TPE to H level. As a result, the charge pump circuit 30 operates, so that the internal voltage Vnn is gradually reduced.

At time t2, the internal voltage Vnn reaches the target value Vtr, and thus the control voltage Vo also reaches the positive voltage Vb. Therefore, the test pump enable signal TPE falls from H level to L level. In response to this, the charge pumping circuit 30 discontinues its operation.

Note that, although not shown in the figure, the internal voltage Vnn may rise from the target value Vtr at time t2 or later. In such a case, the control voltage Vo is responsively reduced. Therefore, the charge pumping circuit 30 operates again, so that the internal voltage Vnn can be restored to the target value Vtr.

Thus, in the test mode, it is possible to adjust the internal voltage Vnn to an arbitrary level without requiring application of external negative voltage, that is, by using the positive voltages Va, Vb applied through the same input terminals 2a, 2b as those used in the normal operation.

Accordingly, no stationary leak current will be produced even when the input terminal 2a, 2b for which the same simplified protection circuit as that of FIG. 5 is provided is shared with another chip or the like.

Moreover, the voltage-dividing circuit for producing the control voltage is formed with a plurality of resistance units fabricated based on the same design layout. Therefore, variation in voltage dividing ratio due to manufacturing process variation is suppressed, enabling accurate adjustment of the internal voltage Vnn in the test mode.

The semiconductor integrated circuit device according to the present invention operates the negative power supply circuit according to the relation between the positive voltage Vb and the negative internal voltage Vnn, enabling adjustment of the internal voltage level without requiring application of negative voltage.

Moreover, the semiconductor integrated circuit device of the present invention includes the input switching circuits 5a, 5b, enabling external adjustment of the internal voltage level in the test mode by using the same input terminals as those used in the normal operation.

Moreover, variation in voltage dividing ratio of the voltage dividing circuit due to manufacturing variation in resistance value can be suppressed, enabling accurate adjustment of the internal voltage level while eliminating the effects of the manufacturing process variation.

Although the present invention has been described and illustrated in detail, it is clearly understood that the same is by way of illustration and example only and is not to be taken by way of limitation, the sprit and scope of the present invention being limited only by the terms of the appended claims.

What is claimed is:

1. A semiconductor integrated circuit device, comprising:
   an internal voltage supply line for supplying a negative internal voltage to an internal circuit;
   a control voltage generation circuit for generating a control voltage according to a difference between a first positive voltage and said internal voltage; and
   a negative power supply circuit for reducing the voltage on said internal voltage supply line in operation, wherein
   in a test mode, said negative power supply circuit operates according to a comparison result between a second positive voltage and said control voltage, said second positive voltage corresponding to a target value of said internal voltage.

2. The semiconductor integrated circuit device according to claim 1, further comprising:
   first and second input terminals capable of externally receiving first and second electric signals, respectively; and
   first and second input switching circuits respectively corresponding to said first and second input terminals, wherein
   said first input switching circuit transmits said first electric signal to said internal circuit in normal operation, and transmits said first electric signal to said control voltage generation circuit in said test mode,
   said second input switching circuit transmits said second electric signal to said internal circuit in the normal operation, and transmits said second electric signal to said negative power supply circuit in said test mode, and
   in said test mode, said first and second positive voltages are respectively applied through said first and second input terminals.

3. The semiconductor integrated circuit device according to claim 1, wherein said negative power supply circuit includes
   a charge pumping circuit for supplying negative charges to said internal voltage supply line when an enable signal is active, and
   a voltage comparison circuit for amplifying a difference between said second positive voltage and said control voltage to produce said enable signal in said test mode.

4. The semiconductor integrated circuit device according to claim 1, wherein said control voltage generation circuit includes a voltage dividing circuit for receiving said first positive voltage and said internal voltage and outputting said control voltage based on said voltage difference multiplied by a prescribed voltage dividing ratio.

5. The semiconductor integrated circuit device according to claim 4, wherein said voltage dividing circuit includes
   n resistance units (where n is a natural number) electrically coupled between a first node to which said first positive voltage is transmitted and a second node on which said control voltage is generated, and
   m resistance units (where m is a natural number) electrically coupled between said internal voltage supply line and said second node, and
   said resistance units are fabricated based on same layout design.

6. The semiconductor integrated circuit device according to claim 4, wherein said second positive voltage is set according to said target value, said first positive voltage and said voltage dividing ratio.

* * * * *